United States Patent [19]

Sawyer

[11] 3,734,855
[45] May 22, 1973

[54] CONNECTOR FOR USE IN PERMEABILITY SEPARATION DEVICES

[75] Inventor: Ernest Robert Sawyer, Solana Beach, Calif.

[73] Assignee: Calgon Corporation, Pittsburgh, Pa.

[22] Filed: May 20, 1971

[21] Appl. No.: 145,156

[52] U.S. Cl. .................. 210/321, 210/433, 210/490
[51] Int. Cl. ............................................. B01d 31/00
[58] Field of Search ...................... 210/22, 23, 321, 210/433, 456, 323, 490

[56] References Cited

UNITED STATES PATENTS

| 3,616,929 | 11/1971 | Mahjikian | 210/456 X |
| 3,421,782 | 1/1969 | Kalish et al | 285/248 |
| 3,480,147 | 11/1969 | Kahyuk | 210/321 |
| 3,648,754 | 3/1972 | Sephton | 210/321 X |

Primary Examiner—Frank A. Spear, Jr.
Attorney—Rudolph J. Anderson, Harry E. Westlake and Frank M. Mahon

[57] ABSTRACT

A new device is disclosed for connecting headers, turn-arounds, and the like to membrane support tubes. The device comprises a plastic adapter tube for insertion within a permeable coated tube, having an O-ring seal at its end, and includes a sleeve which snugly fits around the adapter and effects a seal between the adapter and the membrane portion of the tube when pressure is applied from inside the tube through the action of pressure applied in a permeability separation process. In a variation of the invention, a guard is provided for retaining a volume displacement rod within the membrane coated tube.

4 Claims, 3 Drawing Figures

Patented May 22, 1973

3,734,855

INVENTOR.
ERNEST ROBERT SAWYER
BY
William L. Krayer
ATTORNEY.

CONNECTOR FOR USE IN PERMEABILITY SEPARATION DEVICES

BACKGROUND OF THE INVENTION

Prior to the present invention, a difficult problem has been presented in the construction of tubular permeability separation apparatus such as is disclosed in Havens U.S. Pat. No. 3,457,170 and Shaines et al. U.S. Pat. No. 3,547,272. The problem has been to interconnect a number of internally membrane coated tubes in series in such a way that undue loss of pressure is not caused by turn-arounds, and in such a way that erosion of the membrane is not caused by the turbulence of the treated fluid in the process of reversing its flow. Erosion and abrasion caused by flexing of the tubes during stopping and start-up of a pressure process results in wearing away the permeable membrane, leaving the exposed surface of the support tube which, of course, is able to transport molecules much larger than those otherwise excluded by the membrane coated tube. Both small and bulky molecules find little resistance to passage in such an area, which defeats the purpose of the module. Abrasion or erosion of even a small area of membrane in a single tube of, for example, an 18 tube module can thus render the entire module unacceptable. The problem has become more acute as the modules have grown in size from a conventional seven tube size to the now accepted eighteen tube size. Any seals or turn-arounds which leave exposed the very end of the membrane coated tube are susceptible to erosion and abrasion.

Examples of patents which deal with the problem of seals and turn-arounds in tubular permeability separation devices include: Bray, U.S. Pat. No. 3,542,199; Wallach, U.S. Pat. No., 2,386,836; Zender, U.S. Pat. No. 2,411,238; Kollsman, U.S. Pat. No. 2,987,472; Newcomb, U.S. Pat. No. 2,353,489; Mahon, U.S. Pat. No. 3,228,876; McCormack, U.S. Pat. No. 3,246,764; Clark, U.S. Pat. No. 3,430,770; Manjikian, U.S. Pat. No. 3,485,374 and Clark, U.S. Pat. No. 3,542,204. Kanyok, in U.S. Pat. No. 3,480,170, illustrates a resilient tubular plug which is designed to overcome some of the problems mentioned above. The resilient tubular plug includes a portion inserted in the membrane coated tube.

My invention is particularly applicable to reverse osmosis apparatus employing tubes of the type used in Havens, U.S. Pat. No. 3,547,170.

SUMMARY OF THE INVENTION

My invention includes three parts, namely (1) a generally tubular insert designed to fit snugly in a membrane coated tube, and having means to accommodate an O-ring, (2) an O-ring, and (3) a sleeve for the end of the adapter, capable of forming a firm seal between the adapter and the membrane tube. The annular portion may hold a nub for contacting a volume displacement rod while permitting the unrestricted flow of feed solution.

It has become relatively common for tubular permeability separator systems to include volume displacement rods whose purpose is to occupy a significant portion of the volume of the tube, thereby increasing the surface to volume ratio. Where such tubes are used, my invention contemplates the use of an extension or nose on the anterior end of the adapter. This extension nub or nose is designed to butt against the centrally oriented volume displacement rod so that a continuous uninterrupted flow of treated material may continue more or less along the outer circumference of the tube interior. The extension or nose is held by three or four fingers attached to or as an integral part of the adapter body, leaving space for the treated fluid to flow through and into the adapter.

My invention will be discussed in more detail with reference to the attached drawings.

Figure 1:
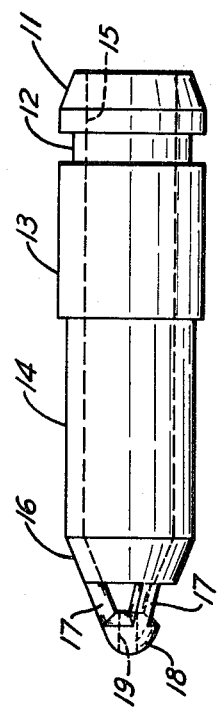
FIG. 1 is a side elevational view of the hollow adapter body.

In FIG. 1, the posterior end 11 of the adapter is slightly tapered to permit ready accommodation to the end of a socket in a header. Annular groove 12 is provided to accommodate an O-ring. Body portion 13 of the adapter has an outer diameter equal to the internal diameter of a socket (shown in FIG. 3) in a header. Section 14 of the adapter body has a slightly smaller external diameter. This section 14 terminates in a tapered portion 16. Within the adapter is an internal channel 15 which also tapers in section 16. Three fingers 17 hold an anterior central nub 18 having a port 19.

Figure 2:
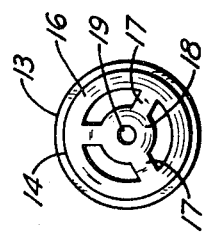
FIG. 2 is in anterior end view of the adapter body.

Referring to FIG. 2, the anterior elevational view shows body portion 13, section 14, fingers 17, nub 18 and port 19.

Figure 3:
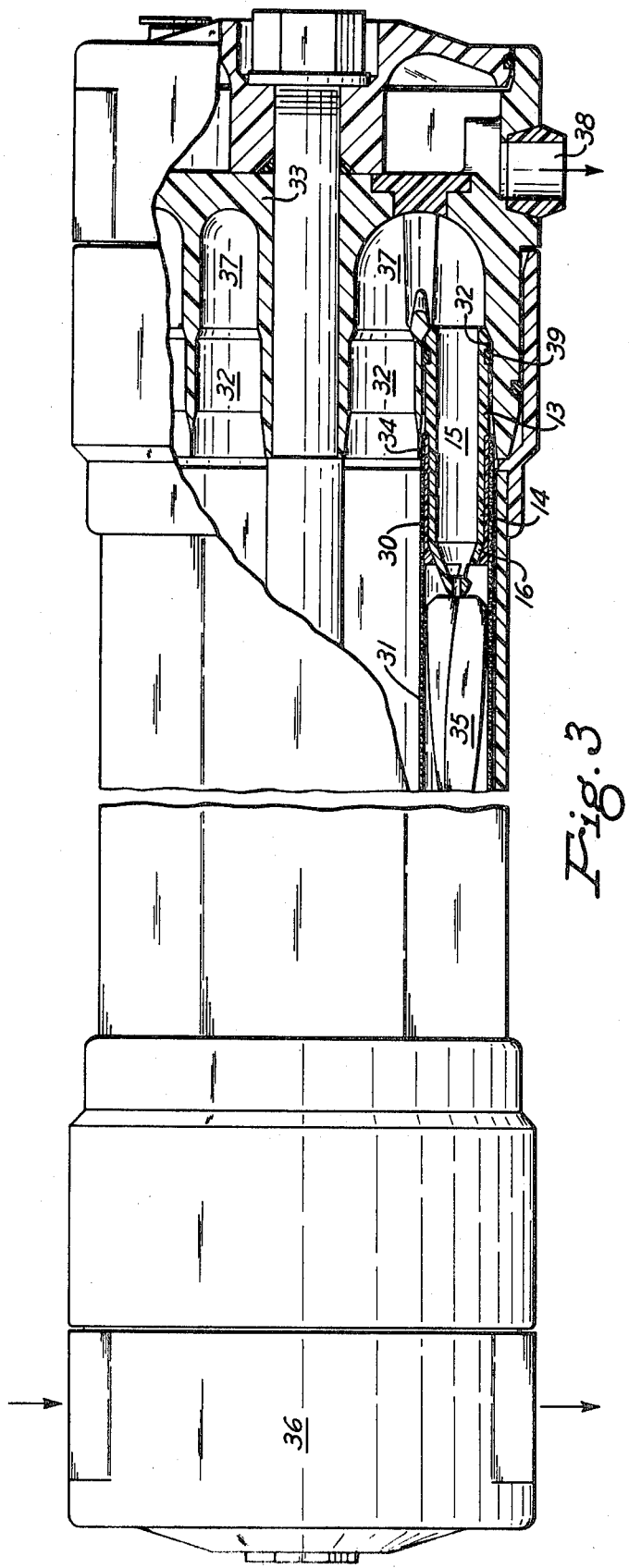
FIG. 3 is a side sectional view of the complete adapter, with sleeve and O-ring, in place in a reverse osmosis module.

FIG. 3 is a side sectional view of the adapter and accessory parts in place in a module which is broken away to illustrate the positioning of the adapter. In FIG. 3, a sleeve (30) is positioned around the relatively narrow section 14 of the adapter body. It should be noted that sleeve 30 butts against the body portion 13 of the adapter, and is surrounded by the permeable support tube 31, which contains a semipermeable membrane coated on its interior surface. The interior surface of support tube 31, similar to that described in Havens, U.S. Pat. No. 3,457,170, is flush against the sleeve 30. Sockets 32 of the header element 33 are adapted to receive the posterior end of the adapter snugly. The posterior end of the adapter also accommodates an O-ring 39 which forms a seal with socket 32. The tube 31 extends into socket 32 to a point 34 sufficiently distant to permit a tight seal between the tube 31 and the wall of socket 32. Positioned near the anterior nub 18 of the adapter is a volume displacement rod 35 whose purpose, as is known in the art, is to increase the ratio of membrane surface to feed volume. The feed solution passes into the pressure head 36, through a series of tubes 31 and turn-arounds 37 and back out through the pressure head, usually to another module as is known in the art. Permeate product is conducted from outside tubes 31 to permeate collection port 38.

When pressure is applied throughout the feed solution system, the adapter body tends to move in the direction of its anterior end, regardless of the direction of flow of the feed solution. This is because the effective surface area of the posterior end is greater than the effective surface area of the anterior end. An excellent seal is thus formed, with sleeve 30 being pressed against the end of tube 31. In addition, surface 16 exerts a wedge-like action on sleeve 30, pressing it outwardly against the tube.

Typically a header such as header element 33 will have enough sockets 32 to accommodate 18 tubes 31.

My invention permits easy assembly of a module by inserting into headers at each end (pressure header and product header) the various parts of the adapter, namely the adapter body with O-ring, and the sleeve. The tubes 31 are then placed over the adapters at one end and all 18 tubes are forced into a snug relationship simultaneously.

I claim:

1. A connector assembly for a tubular permeability separator comprising (a) a generally tubular adapter body including an interior portion having a relatively small exterior diameter and a posterior portion including a relatively large exterior diameter and having a circular external groove for accommodating an O-ring; (b) an O-ring seal on said posterior portion, and (c) a separate sleeve snugly fitted on said anterior portion and having a circumferencial lip on the flange at the point between the anterior and posterior portions of said adapter.

2. The connector assembly of claim 1 wherein the anterior portion includes a terminal nub held in place by fingers without obstructing the continuity of the hollow interior of the connector assembly.

3. The connector assembly of claim 1 in combination with and connecting (a) a permeability separator tube having an internally coated membrane and (b) a header unit including a turn-around and snugly fitted socket for the adapter body.

4. The connector assembly of claim 1 wherein the posterior end of the adapter body is tapered.

* * * * *